UNITED STATES PATENT OFFICE 3,816,533
Patented June 11, 1974

3,816,533
CRYSTALLINE HYDROGENSULFATES OF QUATERNARY AMMONIUM COMPOUNDS AND THEIR USE
Arne Elof Brandstrom, Goteborg, Klas Ragnar Gustavii, Kungsbacka, Ulf Krister Junggren, Pixbo, and Bo Robert Lamm, Goteborg, Sweden, assignors to Aktiebolaget Hassle, Goteborg, Sweden
No Drawing. Filed June 10, 1970, Ser. No. 45,257
Claims priority, application Sweden, June 12, 1969, 8,343/69
Int. Cl. C07c 87/04
U.S. Cl. 260—567.6 M                    4 Claims

ABSTRACT OF THE DISCLOSURE

Crystallized hydrogensulfates of quaternary ammonium compounds described by the general formula $$(R^1)_3R^2N^+HSO_4^-$$

wherein $R^2$ is selected from the group consisting of saturated alkyl groups having from 3 to 6 carbon atoms and aryl, preferably phenyl or monosubstituted phenyl and $R^1$ is selected from the group consisting of saturated alkyl groups having from 1 to 6 carbon atoms provided that when $R^2$ is an alkyl group having from 3 to 6 carbon atoms, $R^1$ must be an alkyl group having from 3 to 6 carbon atoms. Such compounds are useful in chemical and physical-chemical operations in analytical and preparative organic chemistry, e.g. in ion-pair extractions and as enforcing electrolyte in polarography and synthetic electrochemistry. Methods for their preparation and for carrying out ion-pair extractions are also described.

---

The present invention relates to crystallized hydrogensulfates of quaternary ammonium compounds to be used in chemical and physical-chemical operations in analytical and preparative organic chemistry, e.g., in ion-pair extractions and as enforcing electrolyte in polarography and synthetic electrochemistry, their preparation, and a method for carrying out ion-pair extraction.

One object of the present invention is to obtain compounds, which are difficult to extract with ordinary solvents such as chloroform and which are stable and not sensitive to air and are easily obtained in pure form.

A second object of the present invention is to extract anions from a water phase to a solvent phase, such as chloroform or methylene chloride, by means of compounds which are difficult to extract in such solvents, the anions being extracted as ion pairs by means of these compounds.

Another object of the present invention is to carry out this ion-pair extraction by means of compounds which are easy to obtain in pure form, free from disturbing ions and which are completely stable and not sensitive to air.

The nucleophilic displacement reaction is one of the most important reactions in preparative organic chemistry and has thus been extensively studied. The main problem associated with this reaction is that salts containing the appropriate anion are often not very soluble in organic solvents. This problem has been circumvented in several different ways none of which is entirely satisfactory.

(1) Reactions in an organic layer with the salt present as a solid.

(2) Reaction in a two layer system with the salt in the aqueous layer.

(3) Reaction in hydroxylic solvents.

(4) Reaction in highly polar aprotic solvents.

The disadvantages with a reaction according to point 1 are obvious. The reactions according to points 2 and 3 show the distadvantage that protic solvents readily solvate anions and thus decrease their reactivity. The reaction time will therefore be highly increased. Further, protolytic side reactions will also interfere, if the anion is a strong base.

At present the reaction according to point 4 is the most used one especially using DMSO (dimethylsulfoxide), DMF (dimethylformamide) and HMPA (hexamethylphosphoramide) as solvents. These solvents readily dissolve many salts and the anions have a very high reactivity since they are poorly solvated. This method has, however, several disadvantages owing to the facts that the solvents are expensive, and usually not readily recovered, that the reactions are often sensitive to traces of water and that these solvents tend to increase the extent of O-alkylation at the expense of C-alkylation in reactions with mesomeric anions. All these problems can be avoided if a salt which is soluble in water-immiscible organic solvents, is used.

It has now surprisingly been found that crystallized hydrogensulfates of quaternary ammonium compounds which show the advantages that they are readily obtained in pure condition free from disturbing ions, that they are completely stable and insensitive to air, and that they are very difficult to extract, are suitable to be used in the above defined field.

The compounds according to the present invention are described by the general formula $$(R^1)_3R^2N^+HSO_4^-$$

wherein $R^2$ is selected from the group consisting of saturated alkyl groups having from 3 to 6 carbon atoms and aryl, preferably phenyl or monosubstituted phenyl and $R^1$ is selected from the group consisting of saturated alkyl groups having from 1 to 6 carbon atoms provided that when $R^2$ is an alkyl group having from 3 to 6 carbon atoms, $R^1$ must be an alkyl group having from 3 to 6 carbon atoms.

Suitable compounds are:

tetrapropylammonium hydrogen sulfate
tetraisopropylammonium hydrogen sulfate
tetrabutylammonium hydrogen sulfate
tetraisobutylammonium hydrogen sulfate
tetraamylammonium hydrogen sulfate
tetrahexylammonium hydrogen sulfate
phenyltrimethylammonium hydrogen sulfate
phenyltriethylammonium hydrogen sulfate
phenyltributylammonium hydrogen sulfate
p-tolyltriethylammonium hydrogen sulfate
p-chlorophenyltriethylammonium hydrogen sulfate These compounds may be prepared in several different ways which is shown by the general methods illustrated below:

The compounds of the general formula $$(R^1)_3R^2N^+HSO_4 \qquad I$$

in which formula $R^1$ and $R^2$ are as defined above is prepared as follows:

(A) A compound of the general formula $$(R^1)_3R^2N^+O_3SOR^-$$

in which R is selected from the group consisting of lower alkyl groups having from 1 to 4 carbon atoms is reacted with $H_2O$ during acid catalysis to form a compound of the general formula I.

(B) A compound of the general formula $$(R^1)_3R^2N^+A^-$$

in which formula $A^-$ is a lipophilic anion of a week acid, is reacted with $H_2SO_4$ to form a compound of the general formula I.

(C) A compound of the general formula $(R^1)_3R^2N^+OH^-$ is reacted with $H_2SO_4$ to form a compound of the general formula I.

(D) A compound of the general formula $(R^1)_3R^2N^+X^-$ is reacted with a compound of the general formula $Q^+HSO_4^-$ in which formula X is selected from the group consisting of halogenides, alkylsulfates, perchlorates and arylsulfonates and Q denotes an ammonium ion, which need not be a quaternary ion, (E) A compound of the general formula $(R^1)_3R^2N^+I^-$ is reacted with $H_2SO_4$ in the presence of $H_2O_2$ to form a compound of the general formula I.

Thus, it is possible to hydrolyze the quaternary ammonium salt of a dialkylsulfate (A) with water by means of an acid catalyst such as sulfuric acid, or another strong acid, in a manner known *per se*, the hydrogen sulfate thus obtained being freed from solvent and the catalytic amount of the acid by evaporation *in vacuo*, whereupon the salt is recrystallized from, e.g., methylethylketone.

Another way of preparing the quaternary ammonium hydrogen sulfate relates to the following equilibrium (D).

$Q^+HSO_4^- + (R^1)_3R^2N^+X^- \rightleftarrows Q^+X^- + (R^1)_3R^2N^+HSO_4^-$ in which reaction formula Q is an ammonium ion, which need not be a quaternary ion.

The reaction is carried out in such a way that an aqueous solution containing the ions defined above in stoichiometric amounts is shaken together with an organic solvent such as chloroform or methylene chloride. Thereby $Q^+X^-$ migrates to the organic solvent layer on the assumption that $X^-$ is more easy to extract than $HSO_4^-$ which assumption is valid e.g. for halogenides, alkylsulfates, perchlorates, and alkylsulfonates. The aqueous solution will therefore be enriched in $(R^1)_3R^2N^+HSO_4^-$, which can crystallize by evaporation.

The preparation may also be illustrated by the following reaction scheme (B).

$HA_{solv} + OH^- \rightleftarrows H_2O + A^-_{aq}$
$(R^1)_3R^2N^+Hal^-_{solv} + A^-_{aq} \rightleftarrows (R^1)_3R^2N^+A^-_{solv} + Hal^-_{aq}$
$(R^1)_3R^2N^+A^-_{solv} + H_2SO_4 \rightleftarrows (R^1)_3R^2N^+_{aq} + HSO^-_{4aq} + HA_{solv}$ in which reaction $A^-$ is a lipophilic anion of a weak acid, HA, such as a polyhalogen phenol or a long-chain fatty acid such as oleic acid.

A fuorth way (E) of preparing the hydrogen sulfates is by reacting a quaternary ammonium iodide with sulfuric acid in the presence of hydrogen peroxide in an aqueous solution.

It has also been found that it is possible to form the salts of the nucleophilic compounds by means of an ion-pair extraction. As an active component for obtaining ion pairs there is used at least one compound having the general formula $(R^1)_3R^2N^+HSO_4^-$ in which $R^2$ is selected from the group consisting of saturated alkyl groups having 3 to 6 carbon atoms, and aryl, preferably phenyl or mono-substituted phenyl, and $R^1$ is selected from the group consisting of saturated alkyl groups having from 1 to 6 carbon atoms, provided that when $R^2$ is an alkyl group having from 3 to 6 carbon atoms, $R^1$ must be an alkyl group having from 3 to 6 carbon atoms.

The present invention will be described with reference to the following examples, which, however, are not intended to restrict the invention.

EXAMPLE 1

This example illustrates the preparation of tetrabutylammonium hydrogen sulfate, according to the reaction scheme $Bu_4N^+I^- \xrightarrow{(CH_3)_2SO_4} Bu_4N^+O_3SOCH_3^- \xrightarrow{H_2SO_4} Bu_4N^+HSO_4^-$ 185 grams (1 mole) of n-butyliodide and 185 grams (1 mole) of tributylamine in 500 mls. of acetonitrile were refluxed overnight. After cooling to room temperature, 140 grams (1.1 moles) of dimethylsulfate were added, after which the solution was boiled for 8 hours, the methyl iodide formed being distilled off little by little. Then the acetonitrile was evaporated in vacuo and 500 mls. of water and 1.5 mls. of concentrated sulfuric acid were then added to the residue. The mixture was allowed to boil while distiling off the methanol formed until the theoretical amount of methanol was obtained, which happened after 24 hours. The solution was evaporated in vacuo, whereupon the semi-crystalline crude product was recrystallized from ethylacetate. Yield 200 grams of tetrabutylammonium hydrogen sulfate, having a melting point at 170.6° C.

In the corresponding manner tetrapropyl-, tetraamyl-, phenyltrimethyl- phenyltriethyl-, p-tolyltriethyl-, and p-chlorophenyltriethylammonium hydrogen sulfates were prepared.

EXAMPLE 2

To an aqueous solution of 259 grams (1 mole) of tetrabutylammonium hydroxide, 98 grams (1 mole) of sulfuric acid was added. The solution obtained was evaporated in vacuo, whereupon the residue, tetrabutylammonium hydrogen sulfate, was recrystallized from methylethyl ketone, melting point 170.6° C.

In the corresponding manner tetrahexylammonium hydrogen sulfate was prepared.

EXAMPLE 3

25.8 kgs. (80 moles) of tetrabutylammonium bromide and 22 kgs. (83 moles) of pentachlorophenol were dissolved in 80 liters of toluene. This solution was extracted with 80 liters of water containing 3.4 kgs. (85 moles) of sodium hydroxide. The layers were separated from each other, after which the organic layer containing tetrabutylammonium phenolate was extracted with 80 moles of sulfuric acid in 80 liters of water and then with 40 liters of pure water. The collected water layers were evaporated in vacuo whereupon 80 liters of methylisobutylketone were added. The solution was filtered hot and then was cooled to 0° C. The yield was 25.4 kg. (93.5%) of crystalline tetrabutylammonium hydrogen sulfate.

The amount (1.7 kg.) of $Bu_4N$ Br, which stayed in the aqueous layer at the sodium hydroxide extraction was recovered by extraction with 40 liters of methylene chloride. 1.7 kg. of recovered $Bu_4N$ Br plus 25.4 kg. of $Bu_4N$ $HSO_4$ gives a yield of 100%.

In the event that the compounds prepared according to example 3 above contain sulfuric acid the recrystallization is carried out in the following way:

$Bu_4N$ $HSO_4$ is dissolved in methylisobutylketone, whereupon water free $K_2CO_3$ is added. This mixture is boiled while stirring for two hours. The solution is filtered hot whereupon it is cooled and the tetrabutylammonium hydrogen sulfate precipitates.

The yield is about 90%.

EXAMPLE 4

This example illustrates the preparation of phenyltriethylammonium hydrogen sulfate according to the reaction scheme:

$3(R^1)_3R^2N^+I^- + 2H_2SO_4 + H_2O_2 \longrightarrow$
$2(R^1)_3R^2N^+ + HSO_4^- + (R^1)_3R^2N^+I_3^- + 2H_2O$ To a solution of 27.8 grs. (0.09 moles) of phenyltriethylammoniumiodide and 3.4 mls. (0.06 moles) of concentrated sulfuric acid in 100 mls. of water 4 mls. (0.03 moles) of 30% hydrogen peroxide were added while stirring. The mixture was heated on a water bath for 15 minutes, whereupon it was cooled to room temperature and was filtered. After evaporation of the filtrate in vacuo the compound obtained was recrystallized from isopropanol, whereby 14 g. of phenyltriethylammoniumhydrogen sulfate was obtained having a melting point at 123° C.

In a similar manner tetrabutylammonium hydrogen sulfate was also prepared.

EXAMPLE 5

For the preparation of tetrahexylammonium hydrogen sulfate the reaction according to Example 1 was carried out, with the exception that acetone was used as solvent instead of water. After 15 minutes of heating the acetone was evaporated in vacuo, whereupon the reaction product obtained was recrystallized three times from ethyl acetate.

EXAMPLE 6

This example illustrates the preparation of tetrahexylammonium hydrogen sulfate.

0.05 moles of tetrahexylammonium bromide and 0.052 moles of 2,4,6-trichlorophenol were dissolved in 75 mls. of toluene. This solution was thereupon shaken with three 50 mls. portions of sodium hydroxide containing 0.05, 0.025 and 0.01 moles of NaOH respectively. Thereafter 0.05 moles of $H_2SO_4$ in 50 mls. of water were added to the toluene layer, whereupon the mixture was distilled by means of steam until no more triphenol was distilled off. The water layer was recrystallized from ethyl acetate. Melting point 100–105° C.

The use of the compounds of the present invention according to the invention will now be described in a number of examples, which, however, are not intended to restrict the invention.

As these quaternary ammonium hydrogen sulfates are difficult to extract with chloroform and methylene chloride it is possible to extract the corresponding quaternary ammonium salt for example by adding an alkali salt containing a monovalent anion. These ammonium salts may then be reacted for example with alkyl- or acylhalides, thereby providing a great number of synthesizing methods, almost all of which are clearly superior to conventional methods.

This will be illustrated by the following example, which, however, are not intended to restrict the present invention.

EXAMPLE 7

0.1 moles of tetrabutylammonium hydrogen sulfate in an aqueous solution containing 0.1 moles of $NaN_3$ was extracted with chloroform. The chloroform layer was evaporated thereby to obtain tetrabutylammonium azide, which was readily reacted with an acid chloride to form an acyl azide, which is decomposed by means of heat according to the reaction formula $Bu_4N^+HSO_4 + NaN_3 \longrightarrow Bu_4N^+N_3^- + RCOCl \longrightarrow$
$RCON_3 \xrightarrow{heat} RNCO + N_2$ According to this method alkyl isocyanates are readily prepared.

EXAMPLE 8

In a manner corresponding to the one described in Example 7 tetrabuylammonium isocyanate was prepared by extracting tetrabutyl ammonium hydrogen sulfate and NaNCO. By reacting $Bu_4N^+NCO^-$ with an alkylhalogenide, RX, RNCO was obtained. According to this method isocyanates could also be prepared.

EXAMPLE 9

In the same way as described in Example 7 above tetrabutylammonium nitrite was obtained by reacting $Bu_4N^+HSO_4^-$ and $NaNO_2$. By reacting this salt with an alkyl halogenide the corresponding nitroalkane was prepared, and by using this nitrite source in a water free solvent, diazotization may be obtained.

EXAMPLE 10

In the same way as described in Example 7 above tetrabutylammonium cyanide was obtained by reacting $Bu_4N^+HSO_4^-$ and NaCN, said cyanide being soluble in organic solvents. Then by means of this cyanide, alkyl- or acylcyanides were very easily obtained by a reaction in an organic solvent with the appropriate alkyl- or acylhalogenide.

EXAMPLE 11

By reacting a carboxylic acid, R—COOH, with a quaternary ammonium hydrogen sulfate, such as $Bu_4N^+HSO_4^-$ the tetrabutylammonium salt of the carboxylic acid was obtained. Then by reaction with an alkyl halogenide the corresponding alkyl ester of the carboxylic acid was obtained. This method is especially suitable for the preparation of esters of carboxylic acids, which are decomposed by acid conditions.

EXAMPLE 12

By reacting a quaternary ammonium hydrogen sulfate such as tetrahexylammonium hydrogen sulfate with phenol was readily obtained. By reacting this salt with an alkyl halogenide the corresponding aryl ester was readily obtained according to the reaction

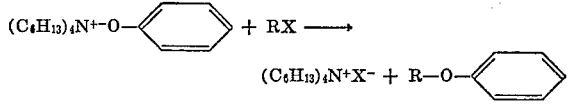

EXAMPLE 13

The compound $Bu_4N^+A^-$, wherein $A^-$ is a mesomer carbanion was very easily obtained by extraction. Most acids, $H^+A^-$ having a $pK_a$ value below 14 can be converted into $Bu_4N^+A^-$ or another quaternary ammonium salt in this way, such as

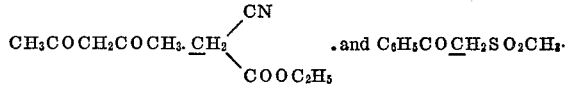

$\underline{C}$ designates the carbon atoms of the molecule which atom is capable of emitting a proton, $\underline{C}$ being negatively charged. If then an alkylhalogenide is added to $Bu_4N^+A^-$ the $\underline{C}$-alkylated product is obtained in high yield and the reaction is almost instantaneous. This is an advantage compared with the conventional method, where boiling for several hours or a whole day (24 hours) is usual.

EXAMPLE 14

This example illustrates an extractive alkylation by means of a tetralkylammonium hydrogen sulfate. Such organic acids $H^+A^-$, which are too weak to form salts in water, may, together with a mixture of a tetralkylammonium hydrogensulfate and NaOH in a water-chloroform dispersion, give enough ion pairs in the chloroform layer to react with an alkyl halogenide. During the reaction the ion pairs are consumed and more ion pairs are extracted into the chloroform layer until everything has been alkylated. The acid $H^+A^-$ will be present in the chloroform layer during all the reaction partly as HA and partly as $Q^+A^-$. If the acid contains an ester group it is thus most probable that this group will not be hydrolyzed. In this way ethylacetoacetate and malonic esters can be alkylated with one or two alkyl groups. Also the very weak acids, $C_6H_5CH_2CN$ and $C_6H_5CH_2COCH_3$ are alkylated under these conditions.

The yields are very good and the method is very simple and rapid and very superior to conventional methods in these respects.

0.1 moles (34 grams) of tetrabutylammonium hydrogen sulfate were added to a cooled solution consisting of 0.2 moles (8 grams) of sodium hydroxide in 75 mls. of water. The mixture was added to a solution of 0.1 moles (11.6 grams) of methylacetoacetate and 0.2 moles of alkyl iodide in 75 mls. of chloroform while stirring. The reaction was exothermic and the mixture became neutral within a few minutes. The layers were separated from each other, the chloroform layer was evaporated and the tetrabutylammonium iodide was precipitated with ether. The iodide was filtered off and the ether was evaporated. The alkylated products were analyzed by NMR and gaschromatography. The yields and products obtained are given in Table 1 below.

TABLE 1

| Alkylation compound, RI | $CH_3CO\underset{R}{\overset{R}{\overset{|}{C}}}HCOOCH_3$ | $CH_3CO\underset{R}{\overset{R}{\overset{|}{C}}}COOCH_3$ | $CH_3C\overset{OR}{\overset{|}{C}}{=}OOCH_3$ |
|---|---|---|---|
| CH₃I | 80 | 10 | 0 |
| C₂H₅I | 83.5 | 9 | 0 |
| (CH₃)₂CHI | 70 | 0 | 23.5 |
| C₄H₉I | 90 | 5 | 0 |

Another way of alkylation by means of an ion pair extraction will be described below, where dimethylbenzoylmalonate, methylcyanoacetate, and acetylacetone are alkylated.

EXAMPLE 15

11.8 grams (0.05 moles) of dimethylbenzoyl malonate in 50 mls. of chloroform were shaken with a solution containing 17 grams (0.05 moles) of tetrabutylammonium hydrogen sulfate and 4 grams (0.1 moles) of sodium hydroxide in 50 mls. of water. The coloroform layer was evaporated and the residue, 15.5 grams of the tetrabutylammonium salt of dimethyl benzoyl malonate was recrystallized from ethyl acetate. Melting point, 109–110° C.

About 0.05 moles of the tetrabutylammonium salt of dimethylbenzoyl malonate were dissolved in 100 mls. of chloroform. Alkyl iodide was added in excess to the solution during stirring.

The reaction with methyl iodide was exothermic and became complete after several minutes.

With ethyl-, isopropyl-, and butyliodide it was necessary to heat to 55° C. for 15 to 30 minutes.

The chloroform was evaporated and the tetrabutylammonium iodide was precipitated with ether. The precipitate was filtered off and washed with ether, whereupon the ether solution was evaporated. The residue was analyzed by NMR. The results are given in Table 2 below.

EXAMPLE 16

The tetrabutylammonium salt of methylcyanoacetate was prepared by adding 0.11 moles (38.4 grams) of tetrabutylamomnium hydrogen sulfate to a solution of 0.21 moles (8.4 grams) of sodium hydroxide in 100 mls. of water, cooled on an icewater bath.

This mixture was shaken with 0.1 moles (9.9 grams) of methylcyanoacetate in 100 mls. of chloroform in a separating funnel until the aqueous layer became neutral (3 minutes). The layers were separated from each other, the chloroform was evaporated and the residue of the chloroform layer was recrystallized from ethylacetate. Yield 23.8 grams (70%). Melting point 83° C.

0.1 moles of alkyliodide were added to a solution of 0.05 moles (17 grams) of tetrabutylammonium salt of methylcyanoacetate in 75 mls. of chloroform while stirring. The reaction was exothermic and was finished (neutral) after a few minutes. The chloroform was evaporated. Ether was added, whereupon the tetrabutylammonium iodide crystallized. The iodide was filtered off. The yield of the iodide was 97%. The ether solution was evaporated and the residue was analyzed with NMR and gas-chromatography. The yields of mono- and dialkylated products in relative amounts are given in Table 3 below with reference to four different alkyl iodides which have been used.

TABLE 3

| Alkylation compound, RI | $NC{-}CHCOOCH_3$ | $NC{-}\overset{R}{\overset{|}{C}}HCOOCH_3$ | $NC{-}\overset{R}{\underset{R}{\overset{|}{C}}}COOCH_3$ |
|---|---|---|---|
| CH₃I | 26.0 | 48.5 | 25.5 |
| C₂H₅I | 14 | 72 | 14 |
| (CH₃)₂CHI | 3 | 94 | 3 |
| C₄H₉I | 7 | 86 | 7 |

EXAMPLE 17

The tetrabutylammonium salt of acetylacetone was prepared by adding 0.5 moles (170 grams) of tetrabutylammonium hydrogen sulfate to a cooled solution of 1.1 moles of sodium hydroxide in 500 mls. of water. 0.5 moles (50 grams) of acetylacetone were added and the solution was extracted with 500 mls. of chloroform. The chloroform layer was evaporated and the crystalline residue was recrystallized from acetone. Yield 70%. Melting point 155° C.

Alkyd iodide was added in double excess to a solution of the tetrabutylammonium salt of acetylacetone in chloroform while stirring in the same way as in Example 16 above. The chloroform and the excess of alkyl iodide were evaporated and the tetrabutylammonium iodide was precipitated by adding ether to the residue. After filtration the ether was evaporated and the residue analyzed by NMR and gas-chromatography, the results in Table 4 below being obtained.

TABLE 2

| Alkylation compound, RI | $C_6H_5{-}\overset{O}{\overset{\|}{C}}\overset{R}{\overset{|}{C}}({-}COOCH_3)_2$ | $C_6H_5\ \overset{OR}{\overset{|}{C}}{=}C(COOCH_3)_2$ |
|---|---|---|
| CH₃I | 100 | 0 |
| C₂H₅I | 54 | 46 |
| (CH₃)₂CHI | 14 | 86 |
| C₄H₉I | 47 | 53 |

TABLE 4

| Alkylation compound, RI | R<br>\|<br>CH₃COCHCOCH₃ | CH₃COC(R)(COCH₃)(R) <br>CH₃COCCOCH₃<br>\|<br>R | OR<br>\|<br>CH₃COC=COCH₃ |
|---|---|---|---|
| CH₃I | 98.5 | | 1.5 |
| C₂H₅I | 72 | 16 | 12 |
| (CH₃)₂CHI | 50.5 | | 49.5 |
| C₄H₉I | 87 | | 13 |

The preparation of another tetrabutylammonium salt is given below which salt can be used for further synthetizing work.

EXAMPLE 18

0.7 moles (238 grams) of tetrabutylammonium hydrogen sulfate were dissolved in 400 mls. of water. A cold solution of 1.3 moles (52 grams) of sodium hydroxide in 350 mls. of water was added. Then a third solution of 0.6 moles (86.5 grams) of methylacetopyruvate in 500 mls. of chloroform was prepared. The solutions were mixed in a separating funnel and shaken for 5 minutes. The layers were separated, whereupon the chloroform layer was treated with active carbon, dried with anhydrous magnesium sulfate, filtered and evaporated in vacuo. The residue, representing a quantitative yield, was recrystallized from acetone. Yellow crystals, 161 grams, M.P. 140° C. (Koefler Heizbank) were obtained, representing a yield of 70% of the tetrabutylammonium salt of methyl acetopyruvate. The identity of the material was verified by NMR.

Monosubstituted phenyl refers to phenyl substituted by chloro or alkyl, preferably methyl.

The weak acid HA, of which the anion A⁻ is used, is selected from the group consisting of polyhalogenated phenols, such as pentachlorophenol and trichlorophenol, and lipophilic carboxylic acids preferably such acids which have at least 10 carbon atoms.

With reference to (column 3, line 10) Q⁺ denotes the ion $R^I R^{II} R^{III} R^{IV} N^+$ where each of $R^I$, $R^{II}$, $R^{III}$ and $R^{IV}$ is selected from the group consisting of hydrogen and hydrocarbons, where two of $R^I$, $R^{II}$, $R^{III}$ and $R^{IV}$ may form a ring, saturated or unsaturated, which may be further interrupted by heteroatoms such as N, O and S, provided that N of the ammonium moiety is bound to hydrogen or carbon and where nitrogen of the ammonium moiety may be bound to a carbon atom via a double bond. $R^I$, $R^{II}$, $R^{III}$ and $R^{IV}$ may be further substituted. Examples of compounds forming such cations are (—)-3,6-dihydroxy-17-methyl-4,5-epoximorfinene-(7),
3-hydroxy-17-methyl-6-oxo-4,5-epoximorfinane,
4-phenyl-1-methylpiperidine carboxylic acid-(4)-ethyl-ester,
4-(3)-hydroxyphenyl)-1-methyl-4-propionylpiperidine,
3,4-dimethyl-1-piperazine dithiocarboxylic acid,
4-methyl-1-diazepine-dithiocarboxylic acid,
diethylaminoacet-2,6-xylidide,
1-(2-allylphenoxy)-3-isopropylaminopropanol-(2),
2-propylamino-N-(2-tolyl) propionamide,
2-propylamino-N-(2-tolyl)-propionamide,
1-butyl-2-(2,6-dimethylphenylcarbamoyl)-piperidine,
N-(4-hydroxy-3-methoxybenzyl)nonanic amide,
hexadecyl-trimethylammoniumhydroxide,
1-hexadecylpyridinium-hydroxide,
1-(3,5-dihydroxyphenyl)-2-isopropylaminoethanol,
6-allyl-6,7-dihydro-5H-dibenz-[c,e]azepine,
2-[N-(3-hydroxyphenyl)-N-(4-tolyl)-aminomethyl]-2-imidazoline, and
1-(4-hydroxyphenyl)-2-(3-phenyl-1-methylpropylamino)-propanol-(1).

We claim:
1. Crystallized tetrapropylammonium hydrogen sulfate.
2. Crystalized tetrabutylammonium hydrogen sulfate.
3. Crystallized tetraamylammonium hydrogen sulfate.
4. Crystalline tetrahexylammonium hydrogen sulfate.

References Cited

UNITED STATES PATENTS 3,038,004  6/1962  Copp et al. _____ 260—567.6 M

OTHER REFERENCES

Kolthoff et al., Journal of the American Chem. Soc., vol. 83, pp. 3927-35 (1961).

Loshkarev et al. Chemical Abstracts, vol. 59, col. 8353 (1963).

Chemical Abstracts Subject Index, vol. 59, p. 169S (1963).

Iofa et al., Chemical Abstracts, vol. 46, col. 9377 (1952).

Iofa et al., Chemical Abstracts, vol. 33, col. 6169 (1939).

Groenewoud et al. Chem. Abstracts, vol. 29, col. 747 (1935).

LEON ZITVER, Primary Examiner

M. W. GLYNN, Assistant Examiner

U.S. Cl. X.R.

260—349, 404, 459, 465 R, 465.5 R, 475 R, 483, 491, 493, 501.15, 567.5, 593 R, 594, 612 D, 453 P; 252—408

PO-1050
(5/69)

UNITED STATES PATENT OFFICE
CERTIFICATE OF CORRECTION

Patent No. 3,816,533  Dated June 11, 1974

Inventor(s) Arne Elof Brandstrom et al.

It is certified that error appears in the above-identified patent and that said Letters Patent are hereby corrected as shown below:

Col. 1, line 71, "distadvantage" should be -- disadvantage --;
Col. 2, line 69, "week" should be -- weak --;
Col. 3, line 31, "Q$^+$HSO$_4$" should be -- Q$^+$HSO$_4^-$ --;
Col. 3, line 40, "HSO$_4$" should be -- HSO$_4^-$ --;
Col. 3, line 54, "fuorth" should be -- fourth --;
Col. 6, line 46, "CH$_3$COCH$_2$COCH$_3$." should be -- CH$_3$CO$\underline{C}$H$_2$COCH$_3$, --;
Col. 6, line 46, ". and" should be -- , and --;
Col. 7, line 72, Col. 8, line 43, (Table 3, 2nd Col.) "NC-CHCOOCH$_3$" should be -- NC-CH$_2$COOCH$_3$ --;
Col. 8, line 59, "Alkyd" should be -- Alkyl --;
Col. 9, Table 4, 1st Column, 2nd compound, "C H$_5$I" should be -- C$_2$H$_5$I --;
Col. 9, Table 4, 1st column, 3rd compound, "(CH$_3$) CHI" should be -- (CH$_3$)$_2$CHI --;
Col. 9, line 54, "4-(3)-hydroxyphenyl)-" should be -- 4-(3-hydroxyphenyl)- --;
Col. 10, line 13, delete entirely. (repeated)
Col. 10, lines 26, 27 & 28, "Crystallized" should be -- Crystalline --.

Signed and sealed this 29th day of October 1974.

(SEAL)
Attest:

McCOY M. GIBSON JR.  C. MARSHALL DANN
Attesting Officer  Commissioner of Patents